US008670706B2

(12) United States Patent
Wilson et al.

(10) Patent No.: US 8,670,706 B2
(45) Date of Patent: Mar. 11, 2014

(54) SYSTEM AND METHOD FOR OPTIMIZING SATELLITE NETWORK UTILIZATION

(75) Inventors: Jeffrey Wilson, Toronto (CA); Ambrose Mok, Thornhill (CA); Dawei Yang, Mississauga (CA)

(73) Assignee: Roadpost Inc., Toronto (CA)

( * ) Notice: Subject to any disclaimer, the term of this patent is extended or adjusted under 35 U.S.C. 154(b) by 681 days.

(21) Appl. No.: 12/815,591

(22) Filed: Jun. 15, 2010

(65) Prior Publication Data

US 2011/0306292 A1    Dec. 15, 2011

(51) Int. Cl.
*H04B 7/185* (2006.01)

(52) U.S. Cl.
USPC ...... 455/12.1; 455/3.02; 455/427; 455/456.1; 455/517; 370/316

(58) Field of Classification Search
USPC .............. 455/12.1, 3.02, 427–430, 439, 455/456.1–456.3, 517, 561; 370/316, 352; 342/357.72
See application file for complete search history.

(56) References Cited

U.S. PATENT DOCUMENTS

| | | | |
|---|---|---|---|
| 5,918,157 A * | 6/1999 | Wiedeman et al. | 455/13.1 |
| 5,974,092 A * | 10/1999 | Roos et al. | 375/272 |
| 6,151,497 A * | 11/2000 | Yee et al. | 455/430 |
| 6,195,555 B1 | 2/2001 | Dent | |
| 7,069,031 B2 | 6/2006 | Maggenti et al. | |

OTHER PUBLICATIONS

International Search Report & Written Opinion, dated Aug. 25, 2011.

* cited by examiner

*Primary Examiner* — Shaima Q Aminzay
(74) *Attorney, Agent, or Firm* — Bereskin & Parr LLP/S.E.N.C.R.L., s.r.l.

(57) ABSTRACT

A system and method for optimizing satellite network utilization is disclosed. The method includes delivering a message to a communication device in the satellite network where a confirmation is received from a satellite network gateway that a message is intended for the communication device, scheduling a notification for the communication device at a scheduled time, and at the scheduled time, instructing the satellite network gateway to send the notification to the communication device. The notification causes the communication device to request the message from the network gateway upon receipt of the notification by the communication device. Scheduling may be coordinated within an alert window time period of the communication device when it is listening for notifications. The start time of the alert window time period may be provided by an application gateway, that along with the communication device, receive network time data to remain synchronized.

22 Claims, 5 Drawing Sheets

SYSTEM AND METHOD FOR OPTIMIZING SATELLITE NETWORK UTILIZATION

FIELD

The present disclosure relates generally to a system and method for optimizing satellite network utilization. More particularly, the disclosure relates to scheduling communications with satellite communication devices.

INTRODUCTION

In traditional two-way messaging systems for mobile communication devices, in order for a device to receive a message, the device must be powered on and listening to a network gateway that stores and forwards messages. When the network gateway receives a message for a target mobile communication device, the gateway either forwards the message to the target device or stores the message and sends a notification to the target device that a message is queued at the gateway. For certain types of messaging protocols, messages are not stored at the network level. For such messaging protocols, messages intended for the target device may be lost if the device is not listening to the network at the time the message or notification is forwarded by the network gateway. If the target device is listening to the network and receives a notification, the device signals the network gateway that it is ready to receive the message and the network gateway responds by sending the message to the target device.

For messages that are stored at the network level, if the target mobile communication device is outside of radio coverage or powered off, then the device will not receive the message or notification, and the device must perform a message inquiry with the network gateway. This message inquiry may be referred to as a mailbox check in certain satellite networks, such as the Iridium™ network. To receive a missed message from the Iridium™ network gateway: (a) the user manually activates the device and performs a mailbox check, either automatically upon activation or through the user's invocation; or (b) the device periodically, on an automatic basis, performs a mailbox check. Some mobile communication devices may also resort to a sleep mode to conserve battery power where the device periodically "wakes up", or powers on, in order to perform a mailbox check with the Iridium™ network gateway.

In cellular telephone networks, cell phones use a control channel to communicate with the gateway, or a base-station, to report their updates, such as the fact that the device is still connected to the network. The base station is constantly being updated with information about a device's availability to receive messages. Cellular networks have sufficient network resources to supply this update information to the base station.

Satellite networks, in contrast, have constrained network resources and must be optimized as much as possible to avoid congestion. If a number of satellite communication devices were to perform a message inquiry at, more or less, the same time, the burst of data traffic from the devices would cause a burden on the satellite network that could result in loss of data. Satellite network operators have noted these data traffic bursts which result in part from satellite communication devices that are configured en masse to have the same reporting period.

In order to support extended battery life in satellite communication devices, the devices enter a "sleep" mode to minimize power consumption during which the device is unable to receive messages or notifications. In the Iridium™ network, upon exiting "sleep" mode, a satellite communication device performs a mailbox check. If a number of satellite communication devices are programmed to exit "sleep" mode at a pre-determined time, such as on the hour, a burst of data traffic on the satellite network will result. Some network operators have also imposed a fee on users for mailbox checks that are performed when there are no messages queued. The fee is to prevent abuse of the satellite network by devices attempting to simulate push message delivery by running the mailbox check several times per hour.

SUMMARY

According to a first aspect, a method is provided for delivering messages to a communication device in a satellite communication network. The method comprises receiving confirmation from a satellite network gateway that a message was intended for the communication device; determining if the communication device is listening for a notification from the satellite communication network; if the communication device is not listening for the notification, determining a scheduled time to send the notification to the communication device; and instructing the satellite communication network gateway at the scheduled time to send the notification to the communication device, wherein the notification is adapted to cause the communication device to request the message from the network gateway upon receipt of the notification by the communication device. In another aspect, the scheduled time corresponds to an alert window time period on the communication device, wherein the communication device is configured to listen for the notification during the alert window time period. In another aspect, the alert window is provided to the communication device in order to minimize overlap with alert window time periods selected for other communication devices in the satellite communication network. In another aspect, the communication device indicates whether the communication device is accepting messages, and instructing the satellite network gateway to send the notification to the communication device is performed only if the communication device is accepting messages.

According to a second aspect, an application gateway is provided for delivering a message to a communication device in a satellite communication network. The application gateway comprises a memory for storing a notification data structure; and a processor configured to receive confirmation from a satellite network gateway that a message is intended for the communication device, determine if the communication device is listening for a notification from the satellite communication network, if the communication device is not listening for notification, determining a scheduled time to send the notification to communication device by storing the notification and the scheduled time in the scheduled notification data structure, and process the scheduled notification data structure to instruct the satellite network gateway at the scheduled time to send the notification to the communication device, wherein the notification is adapted to cause the communication device to request the message from the satellite network gateway over the satellite communication network upon receipt of the notification by the communication device. In another aspect, the scheduled time corresponds to an alert window time period on the communication device, and the communication device is configured to listen for the notification during the alert window time period. In another aspect, the processor is configured to provide the alert window time period to the communication device, and in some aspects, the processor is further configured to select the start time of the alert window time period to minimize overlap with alert windows selected for other communication devices.

DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

The embodiments of the systems, devices and methods described herein may be implemented in hardware or software, or a combination of both. Some of the embodiments described herein may be implemented in computer programs executing on programmable computers, each computer comprising at least one processor, a computer memory (including volatile and non-volatile memory), at least one input device, and at least one output device. For example, and without limitation, the programmable computers may be a server class computer having multiple processors and at least one network interface card. Program code may operate on input data to perform the functions described herein and generate output data.

Although some embodiments may explicitly refer to the Iridium™ satellite communication network and its short burst data service, it will be understood by those of ordinary skill in the art that teachings described herein may be applied to other satellite communication networks. For example, and without limitation, satellite networks such as those owned by Globalstar™, Immarsat™, and ORBCOMM™ may also be used to implement the embodiments described herein.

Figure 1:
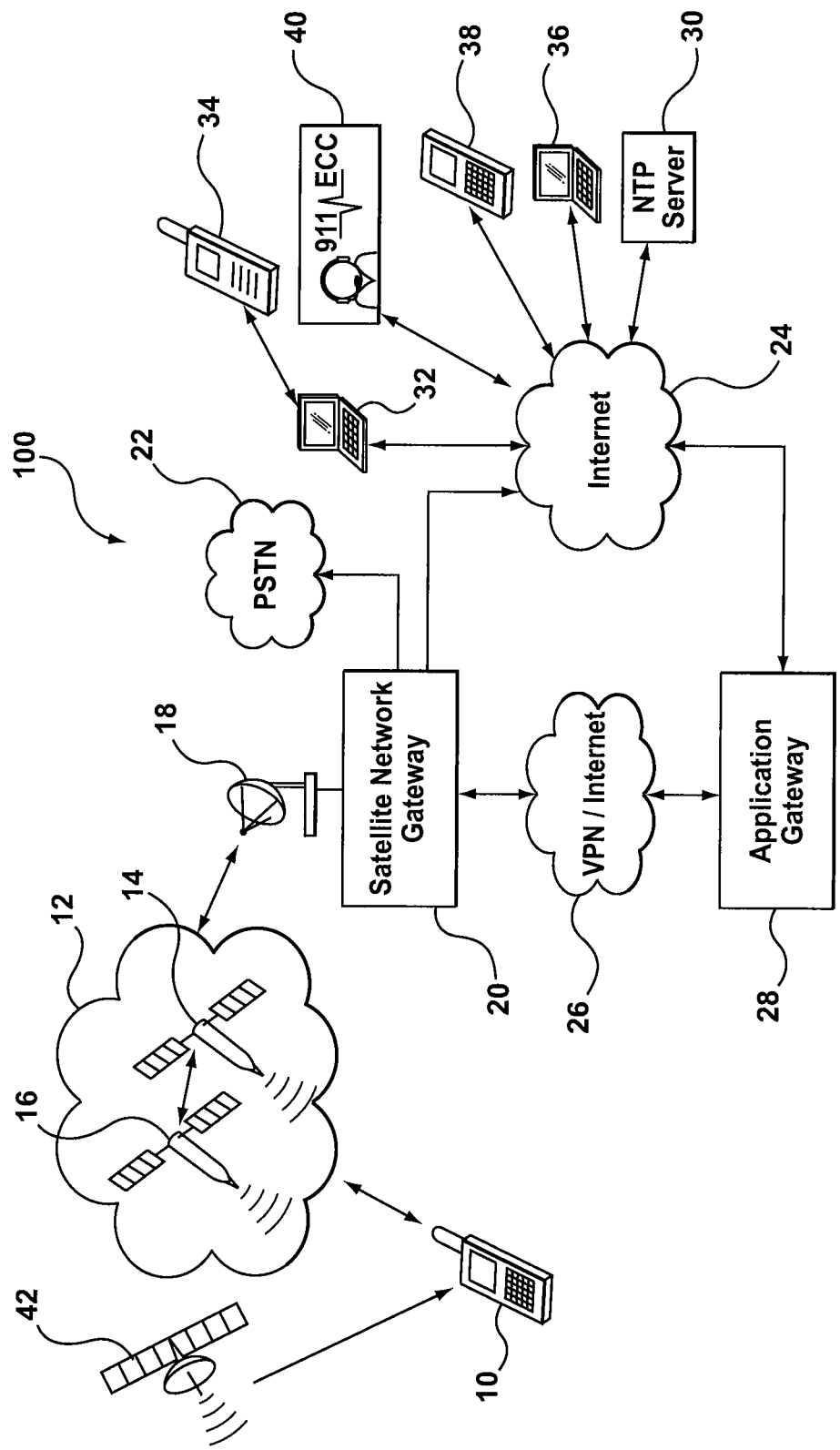
FIG. 1 is a block diagram showing a communication network including a satellite communication network and other terrestrial-based communication networks, according to an embodiment of the present invention.

Reference is first made to FIG. 1, shown is a block diagram of a communication network 100, including a satellite communication network 12 and other terrestrial-based communication networks. Satellite communication device 10 communicates with satellite communication network 12 to transmit and receive voice and data. Satellite communication device 10 may be a satellite phone that is capable of receiving text messages, such as, for example, SMS or email. In other embodiments, satellite communication device may be a satellite transceiver that is connected to another computer system where the satellite communication device is used to transmit and receive data to and from the connected computer system.

Satellite communication network 12 may be comprised of a number of satellites, such as satellite 14 and satellite 16, that route communications between the satellites to satellite network gateway 20. Satellite communication network 12 routes communications from the communication devices, such as satellite communication device 10, to ground station satellite antenna 18 that further routes communications through satellite network gateway 20.

An example of satellite communication network 12 may include the Iridium™ satellite communication network that uses a constellation of low Earth orbit satellites to provide network coverage over the whole Earth. The Iridium™ satellites communicate with each other over inter-satellite links to relay communications to and from ground stations.

Satellite network gateway 20 generates and controls all user information pertaining to the user's satellite communication device, such as user identity, geo-location and billing information. Satellite network gateway 20 also provides connectivity from satellite communication network 12 to terrestrial-based networks, such as publicly switched telephone network (PSTN) 22 for making voice calls to landlines. Satellite communication network 12 may utilize any suitable number of satellite network gateways. For clarity, only a single satellite network gateway 20 is illustrated in FIG. 1. In some embodiments a satellite communication device may only be registered with a single satellite network gateway that manages the device.

Satellite network gateway 20 is also connected by a terrestrial communication link, such as VPN/internet network 26, to communicate with application gateway 28. VPN/internet network 26 may be a private leased line or a virtual private network over the public internet using TCP/IP data exchange via an IPsec VPN socket connection. Other embodiments may employ other known communication links over either private or public networks.

Application gateway 28 may be implemented as a computer server that executes program code to provide services to users of satellite communication devices on the satellite network. The computer server may have at least one processor and memory for storing data and program code. Application gateway may also be implemented as multiple computer servers that may be distributed to provide load balancing or redundancy as known to a person of ordinary skill.

Application gateway 28 may be provisioned by a third party for providing value added services to the third party's customers over satellite communication network 12. In other embodiments, application gateway 28 may be provisioned by an operator of satellite communication network 12 for providing additional services to users of the satellite communication network 12. If provisioned by the operator, the application gateway may also be located at satellite network gateway site.

Application gateway 28 is connected to Internet 24 to provide access to and from services offered by application gateway 28. Access may be provided to the application gateway over the internet using any number of known protocols and frameworks. For example, application gateway 28 may provide a web page or portal, a web services framework or API, or an email server. In other embodiments, application gateway may interface with other networks than the internet, such as, for example, publicly switched telephone network, wireless cellular phone networks, such as SMS servers, or private networks in order to provide services to users connected to those networks.

General purpose computer 36 is connected to Internet 24 and may execute custom software or a web browser software application to interface with application gateway 28. Custom software or web browser software may present a user with options for interacting with the service provided by application gateway 28. In some embodiments, custom software or web browser may allow a user of general purpose computer 36 to input information that identifies a specific satellite communication device, such as the device's phone number or international mobile equipment identity (IMEI), and then allow the user to specify a text message to be sent to the device. In other embodiments, general purpose computer 36 may run e-mail client software that allows a user to send an e-mail message addressed to a satellite communication device that will be received and processed by application gateway 28. The e-mail may be addressed using the phone number or client name at the satellite communication operator or reseller's domain, such as, for example, 88165555551234@iridium-reseller.com.

Mobile communication device 38 is also shown connected to internet 24 to connect to application gateway 28. Mobile communication device 38 may be a mobile phone or smart phone, PDA or any other known wireless communication device. Mobile communication device 38 may connect to internet 24 indirectly through a wireless access gateway of a wireless service provider. The wireless access gateway may communicate data and messages between the mobile communication device 38 and application gateway 28. In mobile phone embodiments, these data and messages may for example be SMS text messages that are addressed to or from the satellite communication device 10.

Emergency call center 40 may also access services of application gateway 28 through internet 24. An emergency call center 40 may send and receive messages with a satellite communication device to administer emergency services to a user of satellite communication device 10. For example, if the satellite communication device is GPS enabled, it may relay GPS location data from GPS satellites 42 to emergency call center 40 upon receiving a request message from the call center or in conjunction with making an emergency call. GPS satellites 42 may also provide a time reference that the satellite communication device 10 may use to synchronize the device's system clock.

Application gateway 28 may also access third party services that are provided through internet 24. For example, a network time protocol (NTP) server 30 or the GPS satellites 42 may provide time data to the application gateway 28 in order to synchronize system clocks within application gateway 28. Other types of information may be provided to application gateway 28 through any number of known protocols or network based servers, such as, for example, database servers, web servers or email. Database servers could provide data about satellite communication devices, such as billing and status information that is provided by satellite communication device vendors or satellite service resellers.

A second satellite communication device 34 is shown connected to a user's personal computer 32 that may be used to access application gateway 28. In one embodiment, a user may connect their satellite device to their personal computer using any known connections or protocols, such as, for example, RS-232 serial cable, Universal Serial Bus (USB) or short-range wireless connections like Bluetooth or IEEE 802.11 based wireless local area networks. User's personal computer 32 may execute software in order to communicate with application gateway 28 in order to configure satellite communication device 34 or transfer other data between satellite communication device 34 and application gateway 28.

The satellite network gateway 20 sends a notification to the satellite communication device 10 that a message for the device has been received by the satellite network gateway 20. One example of such a notification is a "Ring Alert" network command in the Iridium™ satellite network. The receipt of the notification may cause the satellite communication device to send a check message request to the network gateway 20 in order to retrieve the message. One example of such a check message request is a "Mailbox Check" network command in the Iridium™ satellite network.

In one embodiment, the Iridium™ low-earth orbit satellite communication network offers a short burst data (SBD) service that allows two-way messaging between satellite communication devices. In this embodiment, the Iridium™ network gateway is the satellite network gateway 20 and is responsible for storing and forwarding messages from a sender satellite communication device (not shown) to the application gateway 28 and storing messages from the application gateway to forward to the receiving satellite communication device 10. In the Iridium™ SBD network, mobile terminated (MT) messages that are destined for the satellite communication device 10 are queued at the Iridium™ network gateway. An MT message may be received from any number of sources, such as through the internet, e-mail, other satellite communication devices, or the network operator, and some of which may also be routed through an application gateway, such as application gateway 28. Under typical operation, when an MT message is received at the Iridium™ satellite network gateway 20, the Iridium™ satellite network gateway transmits a notification over the Iridium™ SBD network to the intended device indicating that a message is queued at the satellite network gateway 20. The notification is in the form of the Ring Alert network command that is part of the SBD protocol on the Iridium™ network.

The satellite communication device 10 may be powered on and "listening" to the Iridium™ satellite network when the Ring Alert from the Iridium™ satellite network gateway 20 is sent. As used herein, "listening" means the satellite communication device 10 is connected to the satellite communication network 12 in any suitable manner and is ready to communicate with the satellite communication network. For example, the satellite communication device is powered up and has negotiated the handshake protocol with the satellite communication network 12. Upon receiving the Ring Alert, the satellite communication device 10 would then perform a Mailbox Check to retrieve the queued MT messages at the Iridium™ satellite network gateway 20. However, if the satellite communication device 10 is in a sleep mode to conserve battery power or not able to obtain a satellite signal, the Ring Alert will be missed. Upon exiting sleep mode, the device typically performs a Mailbox Check. If no messages for device 10 are queued at the network gateway 20, then the Mailbox Check unnecessarily uses network.

Figure 2:
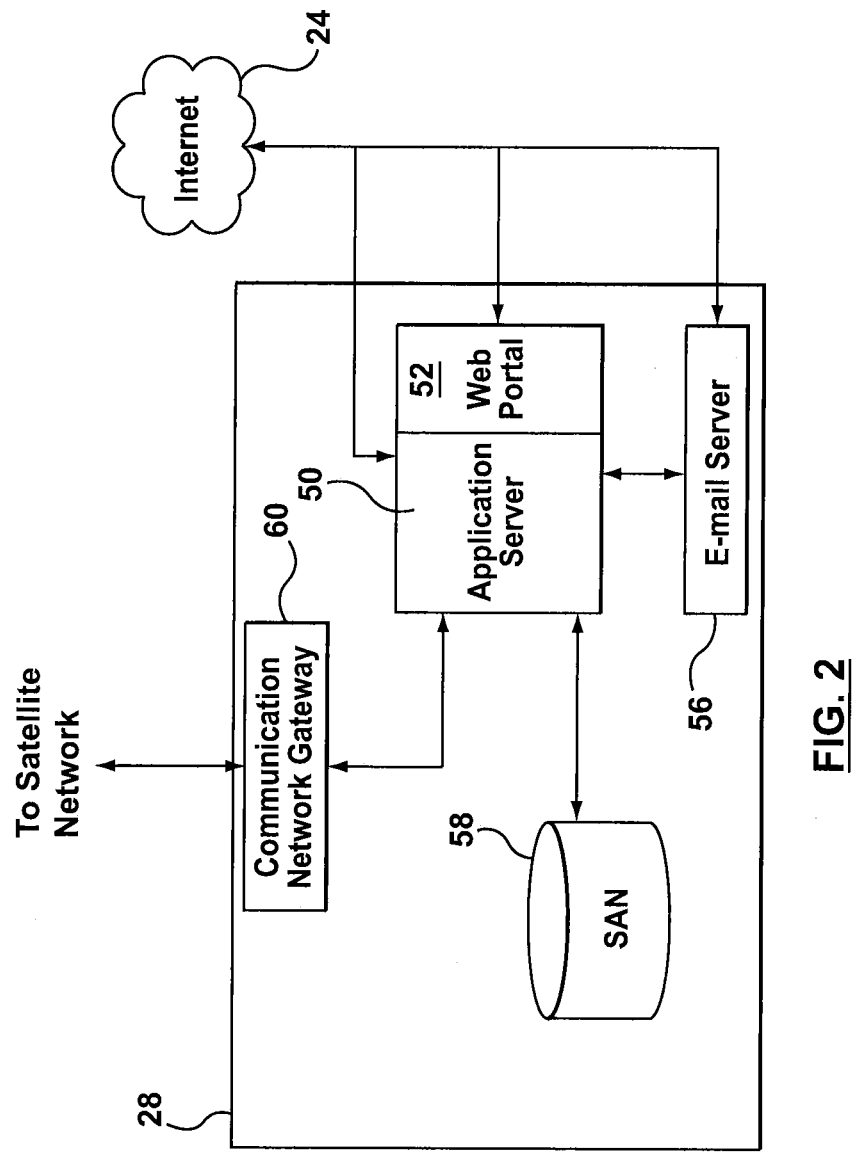
FIG. 2 is a block diagram showing an embodiment of an application gateway for providing services to satellite communication devices.

Reference is next made to FIG. 2, shown is an embodiment of an application gateway 28 for providing services to satellite communication devices. Application gateway 28 includes an application server 50 for providing the service and any associated business logic. Application server 50 may include an interface for communicating through internet 24. In some embodiments, application server 50 may include a web portal 52 that provides a web interface for display by a web browser on a general purpose computer. In other embodiments, web portal 52 may also provide a web services interface. E-mail server 56 is connected to application server 50 to receive and send e-mail messages over internet 24. Communication network gateway 60 acts as an interface to the satellite network gateway 20 and converts communications to and from the protocol used between application gateway 28 and satellite network gateway 20.

Application server 50 is preferably implemented by the use of one or more computers, each computer having at least one processor and a computer readable medium or memory containing software that includes instructions for carrying out one or more functions of application server 50. Application server 50 may also be connected to a storage area network (SAN) 58 that may be used for storing databases containing information about the satellite communication devices. Although application server 50, email server 56, communication gateway 60 are shown as separate entities in FIG. 2, they may also be implemented as software processes in a single computer or distributed in various known ways across multiple computers.

Referring now to FIGS. 1 and 2, in one embodiment, application gateway 28 may schedule notifications for satellite communication devices (such as device 10) that have messages pending at the satellite network gateway 20. Scheduling notification of pending messages by application gateway 28 allows for efficient power consumption by satellite communication device 10 and optimizes network utilization of the satellite communication network 12. If a satellite communication device 10 is turned off, in a sleep state or not receiving a satellite signal, the device is not able to receive notifications that there are messages pending at the satellite network gateway 20. In order to determine whether there are any pending messages for the satellite communication device 10, the device periodically sends a check message request to the satellite network gateway 20. In the embodiment relating to the Iridium™ network, the check message request takes the form of a Mailbox Check network command. The check message request consumes power from the device battery and may create unnecessary network traffic over the satellite network 12 if no messages are pending for satellite communication device 10. By scheduling notifications only when messages are pending and the device 10 is available to receive notifications, battery power of the device can be conserved and unnecessary Mailbox Checks may be reduced.

Figure 3:
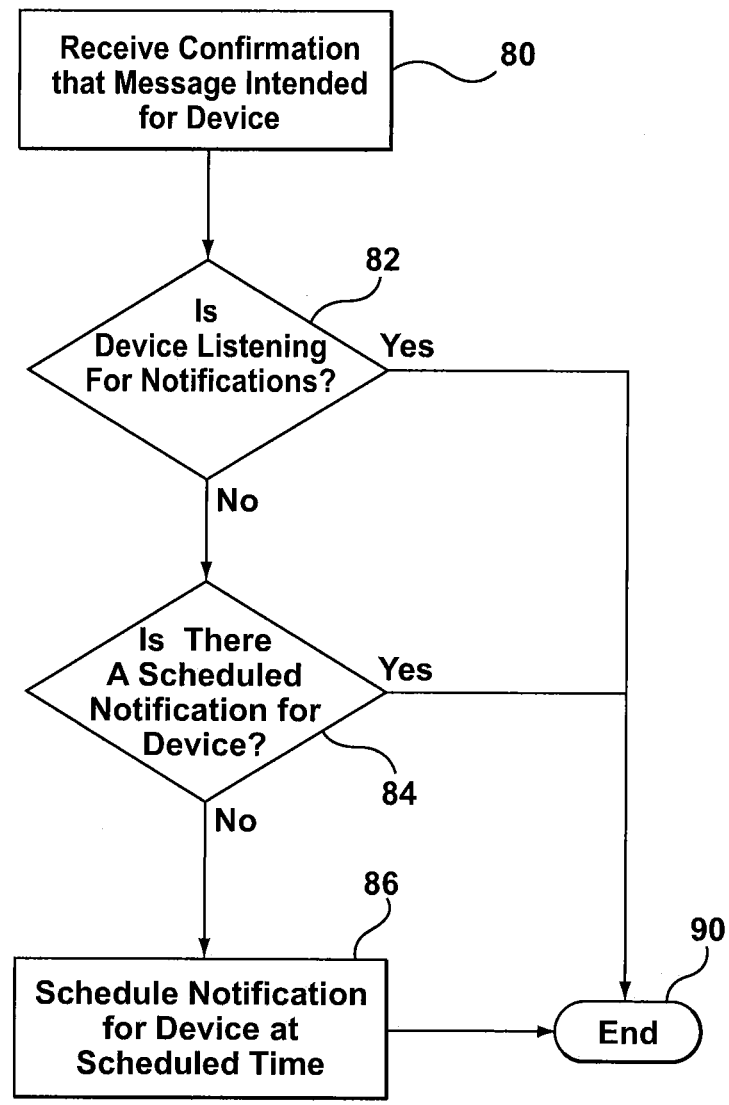
FIG. 3 is a flow chart diagram for processing messages intended for a satellite communication device that is performed by the application gateway of FIG. 2.

Reference is next made to FIG. 3, shown is a flow chart diagram for processing messages intended for the satellite communication device 10 performed by the application gateway 28. At step 80, the process begins with the application gateway receiving confirmation that a message is pending for the satellite communication device 10. The satellite communication device 10 may subscribe to a service offered by the application gateway 28 or the operator of the application gateway may be a satellite communication service reseller or device vendor. Application gateway 28 may receive confirmation that a message is intended for a satellite communication device from the satellite network gateway 20.

Next, in step 82, application gateway 28 determines if the satellite communication device is listening for notifications that messages are pending. Application gateway 28 may receive information from the satellite network gateway 20 regarding the status of the satellite communication device 10 to make this determination. For example, the satellite network gateway 20 may periodically provide status information that the satellite communication device 10 is actively listening for notifications of pending messages from the satellite network gateway. In other embodiments, application gateway 28 may have access to data regarding when the satellite communication device 10 is actively listening for notifications based on a periodic wake-up schedule for the device or a prearranged schedule between the satellite communication device and application gateway. If the satellite communication device 10 is currently listening for notifications, then the device does not require a later scheduled notification and the process ends at step 90.

If the satellite communication device 10 is not currently listening for notifications, the application gateway 28 next determines if there is already a scheduled notification pending for the satellite communication device at step 84. If the application gateway 28 determines that the satellite communication device already has a scheduled notification, the process ends at step 90 since only one notification may be sufficient, regardless of how many messages are queued.

At step 86, preferably the application gateway 28 schedules a notification for the satellite communication device 10 at a scheduled time to notify the device that it has pending messages at the satellite network gateway 20. The scheduled time may be determined by the application gateway to coordinate with known times when the satellite communication device 10 will be listening. These known times may be deterministic for a particular type of satellite communication device, synchronized between the application gateway 28 and the device, or the satellite communication device 10 may communicate its next listening period to the application gateway 28 through the satellite communication network 12. In some embodiments, scheduling a notification for the satellite communication device 10 may include storing an entry into a scheduled notification data structure. For example, application gateway 28 may store an entry in a notification database, the entry including the scheduled time and an identifier for the device, such as an IMEI.

In an embodiment for processing messages in the Iridium™ SBD network, the application gateway 28 will receive a confirmation message from the Iridium™ satellite network gateway 20 after an MT message has been received by the Iridium™ network gateway successfully. A Ring Alert will be scheduled for the device for which the confirmation was received if the device is not currently able to receive Ring Alerts and a Ring Alert is not already scheduled for that device. An Iridium™ satellite communication device is not able to receive a Ring Alert if the device is in a sleep mode to conserve battery power. The application gateway may 28 schedule the Ring Alert at a time that has been coordinated with the device when it will be awake. The scheduled Ring Alert may be stored in a Ring Alert database table at the application gateway 28 that records the device IMEI, the scheduled time and the time that the confirmation message was processed.

Figure 4:
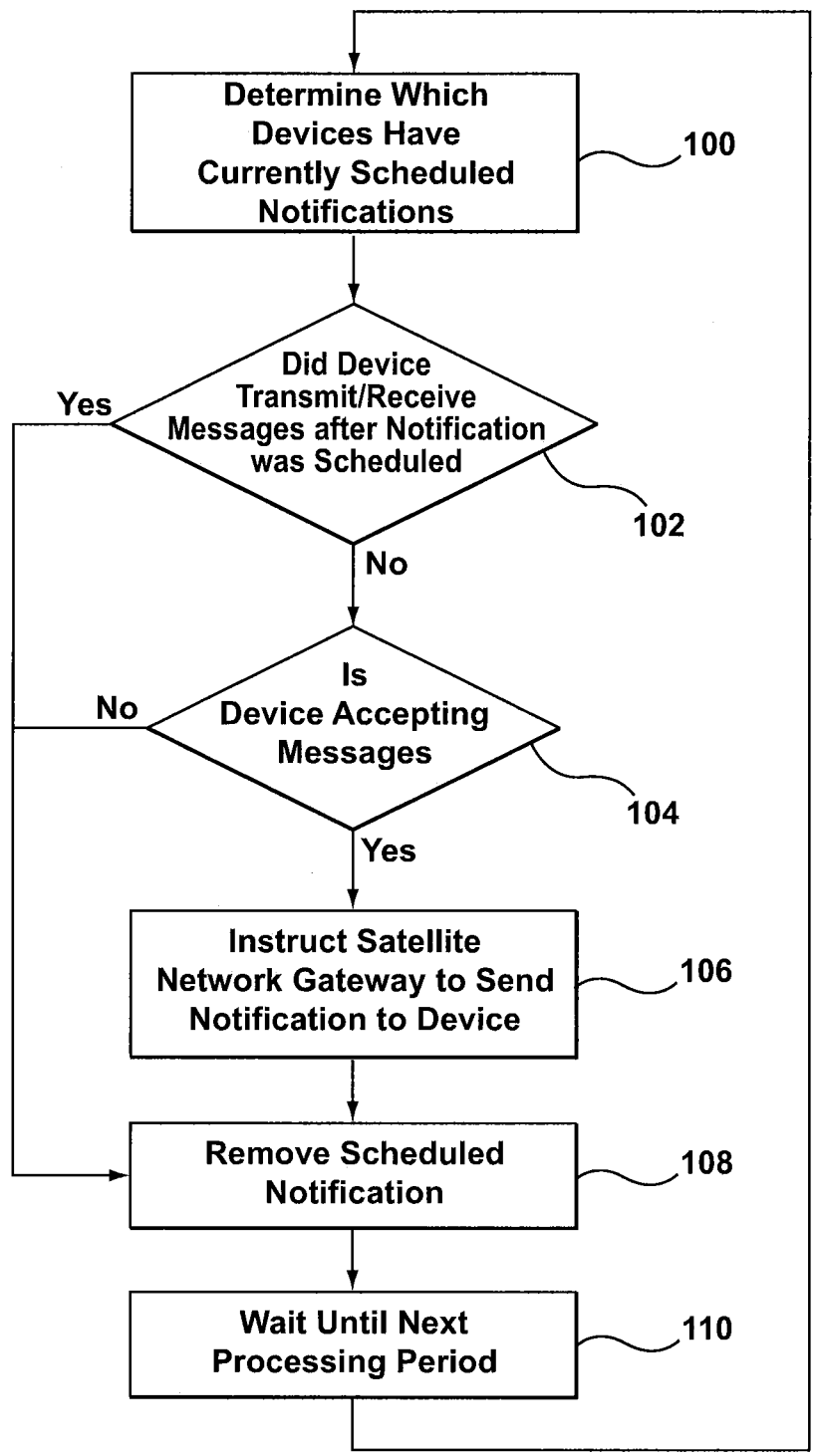
FIG. 4 is a flow chart diagram for processing scheduled notifications by the application gateway of FIG. 2.

Reference is next made to FIG. 4, shown is a flow chart diagram for processing pending notifications by the application gateway 28. Processing begins in step 100 where the application gateway determines which devices have scheduled notifications for the current processing period. After the devices have been identified the following processing will be carried out for each identified device. In step 102, application gateway 28 determines whether the messages corresponding to the notifications have already been received by the selected devices. This may have occurred because messages have already been retrieved (for example, by manually checking for messages). This may also occur when a message is sent, since the protocol for sending a message may include checking for any queued messages. If the satellite communication device 10 already received the messages corresponding to the notification, then the scheduled notification is removed for that device in step 108. This may have occurred because the device 10 may have manually performed a check message request or responded to a notification that messages were pending. In an embodiment in the Iridium™ SBD network, when the Iridium™ satellite network gateway 20 processes a mobile originated (MO) message sent from the satellite communication device 10, the network gateway 20 at the same time notifies the device of any MT messages. Therefore, the satellite communication device 10 retrieves the queued MT message based on the notification received as part of the process for sending the MO message. Thus, it is no longer necessary to schedule a later Ring Alert (which is the embodiment of the notification in the Iridium™ network).

Next, for those devices that have not checked for messages subsequent to the scheduled notification, the application gateway 28 determines if the satellite communication device 10 is accepting messages at step 104. In some embodiments, this may take the form of the device indicating to the application gateway 28 that it is in a "do not disturb" mode. In other embodiments, the device's user interface may require the device user to indicate whether or not the device user is "In Field" where the user should receive messages from the application gateway. This provides a further conservation of satellite network bandwidth by not providing notification messages to those devices that do not want, or are not capable of, receiving messages.

If the satellite communication device 10 is accepting messages, then the application gateway 28 will instruct the satellite network gateway 20 to send the scheduled notification to the device at step 106. Application gateway 28 may send a message to the satellite network gateway 20 that informs the satellite network gateway that the satellite communication device is listening for notifications. The instruction to the satellite network gateway should provide identification information for those devices that are listening for notifications. This may take the form of the device IMEI or phone number.

In an embodiment for the Iridium™ satellite communication network, the application gateway 28 may instruct the Iridium™ satellite network gateway 20 by issuing a Ring Alert disposition flag to the Iridium™ satellite network gateway to "force" a Ring Alert for specified IMEIs. The Iridium™ satellite network gateway 20 will process the Ring Alert disposition flag for the specified IMEI and issue a Ring Alert to the satellite communication device 10 with the corresponding IMEI to indicate that messages are queued for the device 10. This will restrict the number of Ring Alerts that the Iridium™ network issues to only the subset of devices that have messages pending at the Iridium™ satellite network gateway 20. Because the device 10 is listening to the satellite network 12, upon receiving the Ring Alert, the device 10 will perform a Mailbox Check to retrieve the queued messages.

After instructing the satellite network gateway 20 to send the notification, the scheduled notification is removed in step 108. In some embodiments this may involve removing an entry or entries from a scheduled notification database table that is stored at the application gateway. The application gateway 28 then waits until a next processing period in step 110, after which the process returns to step 100 to be repeated. The processing period may be every second, minute or any other amount of time that is selected depending on the number of devices to be serviced or the computing resources available. Alternatively, step 110 may be omitted and the application gateway may continuously process the scheduled notifications.

Figure 5:
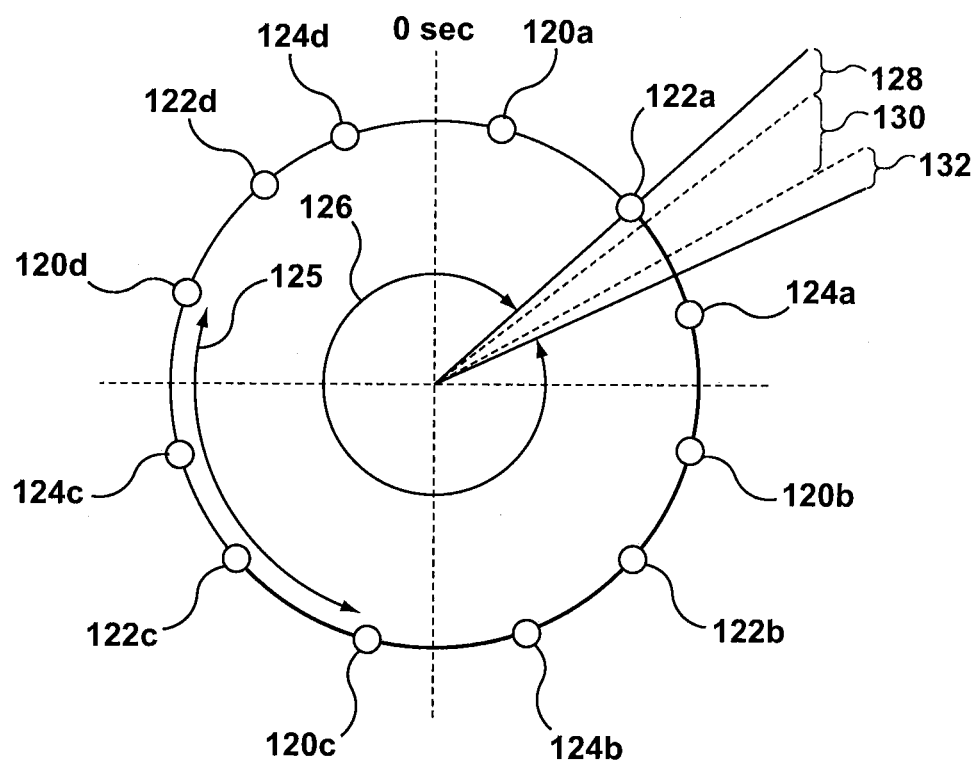
FIG. 5 is a diagram showing alert windows for three different satellite communication devices in one hour, according to an embodiment of the present invention.

Reference is next made to FIG. 5, shown is a diagram illustrating alert windows for three different satellite communication devices in one hour. The circle in FIG. 5 represents an hour of time (3600 seconds). An alert window is a period of time during which a satellite communication device is expected to be listening for notifications. For satellite communication devices that enter a "sleep" mode to conserve battery power, the device will power on and connect to the satellite network during the alert window time period and return to "sleep" mode after the alert window time period. The application gateway 28 and satellite communication devices may synchronize their system clocks so that the application gateway can coordinate scheduling notifications when devices are listening for notifications. Through coordination of the scheduled notifications with the alert window the satellite communication network 12 is used more efficiently to preferably send notifications for a device only when the device is listening for notifications.

The reference numerals 120, 122, and 124 represent alert window start times for three exemplary satellite communication devices. For each particular reference numeral, the letters a-d indicate the start times of four alert windows for each satellite communication device. For example, 120*a*, 120*b*, 120*c*, and 120*d* are alert window start times for satellite communication device 120. Each satellite communication device is shown having 900 seconds, or 15 minutes, between their alert windows as indicated, for example, by arrow 125 between the start time of alert windows 120*c* and 120*d* for first satellite communication device 120. In some embodiments, the application gateway 28 may define and assign each satellite communication device a specific alert window. The alert window may be assigned to devices randomly or assigned to devices so that the overlap between a number of devices that are simultaneously listening for a notification is minimized. Distributing the alert windows for multiple devices over a period of time limits bursts of traffic that would result in possible network congestion if multiple devices performed mailbox checks simultaneously.

In some embodiments, a satellite communication device may be connected to a personal computer, such as through a USB connection, and a synchronization function may be run on the computer that sets an alert window for the device that is received by the computer from the application gateway. The satellite communication device may use GPS time data received from GPS satellites to stay synchronized with the application gateway. Similarly, the application gateway may use time data provided by an NTP server to synchronize its system clock.

Referring again to FIG. 5, each alert window time period may be broken down into further time periods that are described by example with respect to alert window time period 126 with start time 122*a*. At the start time of the alert window 126, there is a wake-up delay 128 that accounts for the time it takes for the satellite communication device 10 to power up and negotiate communications with the satellite communication network 12. Preferably, application gateway 28 takes into account the wake-up delay when scheduling notifications in order to decrease the likelihood that the satellite communication device 10 may miss a notification that is sent during the wake-up delay 128. Following the wake-up delay 128 is a communication period 130 during which the satellite communication 10 device is powered up, connected to the satellite communication network 12 and available to receive notifications. The communication period 130 may be followed by a transit delay period 132 which represents the remaining time required to complete communication with the satellite network. After the transit delay, the satellite communication device may return to a power-saving sleep mode.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A method for delivering a message to a communication device in a satellite communication network, the method comprising:
   an application gateway receiving a confirmation from a satellite network gateway that the message is intended for the communication device, the confirmation indicating that the message was received by the satellite network gateway and is pending delivery to the communication device;
   in response to receiving the confirmation, the application gateway determining, based on a device status data associated with the communication device, whether the communication device is listening for a notification from the satellite communication network, wherein the device status data is available to the application gateway without interacting with the communication device and wherein the device status data comprises at least a listening status indicating that the communication device is available to receive the notification;
   if the application gateway determines that the communication device is not listening for the notification, the application gateway determining, based on the device status data, a scheduled time to send the notification to the communication device; and
   the application gateway instructing the satellite network gateway to send the notification to the communication device at the scheduled time, wherein, upon receipt of the notification by the communication device, the notification is adapted to cause the communication device to request the message from the satellite network gateway.

2. The method of claim 1, wherein the scheduled time corresponds to an alert window time period on the communication device, wherein the communication device is configured to listen for the notification during the alert window time period.

3. The method of claim 2, further comprises providing the alert window time period to the communication device.

4. The method of claim 3, further comprises selecting a start time of the alert window time period to minimize overlap with alert window time periods selected for other communication devices in the satellite communication network.

5. The method of claim 4, wherein the start time of the alert window time period is randomly selected.

6. The method of claim 2, wherein determining the scheduled time takes into account the time required for the communication device to establish communications with the satellite communication network.

7. The method of claim 2, wherein determining the scheduled time utilizes Global Positioning System (GPS) data.

8. The method of claim 1, further comprises canceling the notification if the communication device received the message prior to the scheduled time.

9. The method of claim 1, wherein the communication device indicates whether the communication device is accepting messages, and wherein instructing the satellite network gateway to send the notification to the communication device is performed only if the communication device is accepting messages.

10. The method of claim 1, wherein the satellite communication network is the Iridium™ satellite network and the satellite network gateway comprises an Iridium™ gateway subsystem.

11. The method of claim 10, wherein instructing the satellite network gateway to send the notification further comprises setting a message disposition flag for the communication device at the Iridium™ gateway subsystem.

12. An application gateway system for delivering a message to a communication device in a satellite communication network, the application gateway comprising:
   a memory for storing a scheduled notification data structure; and
   a processor configured to:
      receive a confirmation from a satellite network gateway that the message is intended for the communication device, the confirmation indicating that the message was received by the satellite network gateway and is pending delivery to the communication device,
      in response to receiving the confirmation, determine, based on a device status data associated with the communication device, whether the communication device is listening for a notification from the satellite communication network, wherein the device status data is available to the application gateway without interacting with the communication device and wherein the device status data comprises at least a listening status indicating that the communication device is available to receive the notification,
      if the communication device is not listening for the notification, determining, based on the device status data, a scheduled time to send the notification to the communication device by storing the notification and the scheduled time in the scheduled notification data structure, and
      process the scheduled notification data structure to instruct the satellite network gateway to send the notification to the communication device at the scheduled time, wherein, upon receipt of the notification by the communication device, the notification is adapted to cause the communication device to request the message from the satellite network gateway.

13. The application gateway system of claim 12, wherein the scheduled time corresponds to an alert window time period on the communication device, wherein the communication device is configured to listen for the notification during the alert window time period.

14. The application gateway system of claim 13, wherein the processor is further configured to provide the alert window time period to the communication device.

15. The application gateway system of claim 14, wherein the processor is further configured to select a start time of the alert window to minimize overlap with alert window time periods selected for other communication devices in the satellite communication network.

16. The application gateway system of claim 15, wherein the start time of the alert window time period is randomly selected.

17. The application gateway system of claim 13, wherein the processor is further configured to take into account the time required for the communication device to establish communications with the satellite communication network when determining the scheduled time.

18. The application gateway system of claim 15, wherein the processor is further configured to receive network time data to coordinate the scheduled time with the alert window time period.

19. The application gateway system of claim 12, wherein the processor is further configured to remove the notification from the scheduled notification data structure if the communication device received the message prior to the scheduled time.

20. The application gateway system of claim 12, wherein the communication device indicates whether the communication device is accepting messages, and the processor is further configured to instruct the satellite network gateway at the scheduled time to only send the notification to the communication device if the communication device is accepting messages.

21. The application gateway system of claim 12, wherein the satellite communication network is the Iridium™ satellite network and the satellite network gateway comprises an Iridium™ gateway subsystem.

22. The application gateway system of claim 21, wherein the processor is further configured to instruct the satellite network gateway to send the notification alert further by setting a message disposition flag for the communication device at the Iridium™ gateway subsystem.

* * * * *